UNITED STATES PATENT OFFICE.

FRITZ GRÜNWALD, OF POZSONY, HUNGARY.

PROCESS OF MANUFACTURING ELECTRIC INSULATING MOLDED ARTICLES.

1,330,444.     Specification of Letters Patent.     Patented Feb. 10, 1920.

No Drawing.     Application filed July 3, 1917. Serial No. 178,408.

*To all whom it may concern:*

Be it known that I, Dr. FRITZ GRÜNWALD, a subject of the Emperor of Austria, residing in Pozsony, Hungary, have invented a certain new and useful Process of Manufacturing Electric Insulating Molded Articles, of which the following is a specification.

It has already been proposed to manufacture molded blocks for electric insulating purposes of artificial resin, that is to say of the products of condensation of phenols and formaldehyde with an addition of inert substances such as asbestos in the form of fibers or flakes. This manufacture has, however, met with various difficulties. In mixing the constituents, lumps or pasty masses are formed which it is difficult to mold. On rapidly heating the molded articles they are liable to be rendered entirely unfit for use because bubbles are formed in the same, as the synthetic resin is liable to undergo a further condensation or polymerization under the action of heat; now as the articles are heated from the outside this condensation begins at the surface of the articles whereby a hard skin is formed, and, as in the course of the condensation, water is formed which vaporizes at the existing temperature the hard skin will be broken or severely distorted. For avoiding this it has been suggested to heat the articles under pressure but this greatly reduces the output because for hardening a block of about 16 cubic inches in volume it must be left in the mold under pressure and in the heat for 15 to 20 minutes. Furthermore the water formed by the continued condensation or polymerization within the molded article can not escape, so that when the article is subsequently heated, as in use, bubbles may be formed suddenly which may even result in explosions. Moreover the electric properties of such molded articles get poorer in the course of time.

It has also been proposed to heat the mixture of synthetic resin and inert material very slowly up to a temperature of 100° centigrade for the purpose of preventing both the water from vaporizing and the outer skin from hardening first. With this method, however, several days and even weeks are required for finishing the molded articles.

My improved process consists in adding to mixtures of synthetic resin and inert material from 5 to 20 per cent. by weight of a liquid or liquids, such as water, or hydrocarbons, such as benzol, the boiling temperature and vapor tension of which come near those of water and in which synthetic resin is insoluble, the mixtures thus become flaky and may be readily molded; the articles made of such mixtures are then hardened without any detriment by heating them rapidly in the open air.

This is probably due to the fact that owing to the pressure of the liquid which amounts to from 5 to 20 per cent. by weight of the whole mass the latter is heated uniformly throughout so that no hard skin or layer is formed. Furthermore as the synthetic resin is insoluble in the liquid it will not bake or fuse together as long as there is any liquid whereby also the local hardening of the mass is prevented. The boiling temperature and the vapor tension of the liquid coming very near to those of water which is formed on heating the molded article from the synthetic resin this latter water is removed thoroughly and uniformly any local overheating of the molded article and the detrimental effects resulting therefrom being avoided.

A particular example of the process is as follows:—25 parts of a synthetic resin in the plastic state is placed in a mixing machine (for example, a Werner & Pfleider mixer) with 40 parts of flaky filling material such as asbestos, sawdust, etc., and enough water, or a mixture of water and benzin, added until the mixture becomes flaky, the mixing being done without heating. About 15 parts of water, or of the liquid mixture will usually be found to be required. If the mixture is too stiff, more water is added; if it is too thin, resin and filling material in their relative proportions are added.

This mixture is then, as usual in the cold pressing process, placed in molds, the molded piece taken out of the mold and dried and hardened in an oven by heating at a temperature up to 250° C., without any special precautions in regard to the rapidity of the increase of the temperature or the period of heating.

By this process I obtain articles of superior and permanent insulating properties, and besides the manufacture of the molded articles is greatly facilitated and requires far less time than with the old processes above referred to.

I claim as my invention:

1. A process of manufacturing electric insulating molded articles from a mixture of the products of condensation of phenols and formaldehyde and inert substances consisting in mixing the said condensation products and inert substances with a liquid or liquids in which the condensation products are not soluble and the boiling point and vapor tension of which come near those of water, in then molding the articles and in finally rapidly heating the molded articles under atmospheric pressure whereby they are hardened.

2. A process for manufacturing electric insulating molded articles from a mixture of the products of condensation of phenols and formaldehyde and inert substances consisting in mixing the said condensation products and inert substances with water, in then molding the articles and in finally rapidly heating them in the open air whereby they are hardened.

In witness whereof, I have hereunto signed my name in the presence of two subscribing witnesses.

Dr. FRITZ GRÜNWALD.

Witnesses:
 Diego Lastraso,
 Ignatz Schauen.